(12) United States Patent
Garcia (10) Patent No.: US 9,859,710 B2
(45) Date of Patent: Jan. 2, 2018

(54) LINE IMPEDANCE COMPENSATION SYSTEM

(71) Applicant: VESTAS WIND SYSTEMS A/S, Aarhus (DK)

(72) Inventor: Jorge Martinez Garcia, Aarhus (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 273 days.

(21) Appl. No.: 14/434,290

(22) PCT Filed: Oct. 3, 2013

(86) PCT No.: PCT/DK2013/050313
§ 371 (c)(1),
(2) Date: Apr. 8, 2015

(87) PCT Pub. No.: WO2014/056504
PCT Pub. Date: Apr. 17, 2014

(65) Prior Publication Data
US 2015/0263521 A1    Sep. 17, 2015

Related U.S. Application Data

(60) Provisional application No. 61/711,477, filed on Oct. 9, 2012.

(30) Foreign Application Priority Data

Oct. 8, 2012    (DK) .................... 2012 70613

(51) Int. Cl.
*H02J 1/10* (2006.01)
*H02J 3/38* (2006.01)
(Continued)

(52) U.S. Cl.
CPC ............. *H02J 3/18* (2013.01); *F03D 7/048* (2013.01); *F03D 9/255* (2017.02); *H02J 3/16* (2013.01);
(Continued)

(58) Field of Classification Search
USPC ............................................. 307/52; 290/44
See application file for complete search history.

(56) References Cited

U.S. PATENT DOCUMENTS 7,437,216 B2 * 10/2008 Riesberg ............... F03D 7/0284
290/44
7,462,946 B2 * 12/2008 Wobben ............... F03D 7/0284
290/44

(Continued)

FOREIGN PATENT DOCUMENTS

EP    2108828 A2    10/2009
EP    2175540 A2    4/2010
(Continued)

OTHER PUBLICATIONS

David Di Ruscio: "On Tuning PI controllers for Integrating Plus Time Delay Systems", Modeling, Identification and Control, Apr. 3, 2010.

(Continued)

*Primary Examiner* — Adam Houston
(74) *Attorney, Agent, or Firm* — Patterson + Sheridan, LLP (57) ABSTRACT

The present invention relates to a power plant controller (23), controlling at least one electrical parameter of a wind power plant at a first point (201), the power plant controller receiving at least one measured electrical parameter at a point of measurement (204a, b), the point of measurement being different from the first point, and estimating a delta value of a difference of the at least one electrical parameter (Continued)

between the first point and the point of measurement, wherein estimating of the delta value is calculated based on an impedance between the point of measurement and the first point, and at least one reference value of the power plant controller, and the power plant controller controls the at least one electrical parameter on the basis of the at least one measured electrical parameter and the delta value.

20 Claims, 5 Drawing Sheets (51) Int. Cl.
    *H02J 3/18* (2006.01)
    *F03D 7/04* (2006.01)
    *H02J 3/16* (2006.01)
    *F03D 9/25* (2016.01)

(52) U.S. Cl.
    CPC ............ *H02J 3/386* (2013.01); *Y02E 10/723* (2013.01); *Y02E 10/763* (2013.01); *Y02E 40/34* (2013.01); *Y10T 307/549* (2015.04)

(56) References Cited

U.S. PATENT DOCUMENTS

| | | | | |
|---|---|---|---|---|
| 7,462,947 B2* | 12/2008 | Wobben | ................ | F03D 7/0284 290/44 |
| 8,041,465 B2* | 10/2011 | Larsen | ...................... | H02J 3/16 700/287 |
| 8,058,753 B2* | 11/2011 | Achilles | ................ | F03D 7/0284 307/153 |
| 8,912,675 B2* | 12/2014 | Mata Dumenjo | ..... | H02J 3/1842 290/34 |
| 9,018,782 B2* | 4/2015 | Couchman | .............. | F03D 7/028 290/44 |
| 9,026,258 B2* | 5/2015 | Stapelfeldt | ............ | F03D 7/0284 700/287 |
| 9,035,480 B2* | 5/2015 | Fortmann | ................. | H02J 3/26 290/44 |
| 9,124,134 B2* | 9/2015 | Gomis | ...................... | H02J 3/24 |
| 9,236,742 B2* | 1/2016 | Garcia | .................. | H02J 3/1857 |
| 9,306,395 B2* | 4/2016 | Garcia | .................. | H02J 3/1885 |
| 9,347,429 B2* | 5/2016 | Nielsen | ...................... | F03D 7/00 |
| 9,368,971 B2* | 6/2016 | Ellena | ........................ | H02J 3/38 |
| 9,407,186 B2* | 8/2016 | Babazadeh | ............... | H02P 9/02 |
| 9,458,831 B2* | 10/2016 | Ubben | .................. | H02J 3/1885 |
| 9,496,812 B2* | 11/2016 | Kragelund | ................ | H02P 9/04 |
| 9,518,559 B2* | 12/2016 | Hiromasa | ................. | F03D 7/00 |
| 9,531,193 B2* | 12/2016 | Andresen | .................. | H02J 3/50 |
| 9,541,063 B2* | 1/2017 | Yin | ...................... | G05B 13/021 |
| 9,553,454 B2* | 1/2017 | Beck | ......................... | H02J 3/16 |
| 9,556,852 B2* | 1/2017 | Babazadeh | ............. | F03D 7/048 |
| 2008/0073912 A1 | 3/2008 | Fortmann et al. | | |
| 2009/0218817 A1* | 9/2009 | Cardinal | .................. | F03D 7/028 290/44 |
| 2010/0025994 A1 | 2/2010 | Cardinal et al. | | |
| 2010/0264747 A1* | 10/2010 | Hall | ...................... | B60L 11/182 307/104 |
| 2011/0035077 A1 | 2/2011 | Lee et al. | | |
| 2012/0292904 A1* | 11/2012 | Tarnowski | ............. | H02J 3/386 290/44 |
| 2014/0300108 A1* | 10/2014 | Sahukari | .................. | F03D 7/047 290/44 |
| 2015/0263521 A1* | 9/2015 | Garcia | .................... | F03D 7/048 307/52 |
| 2015/0300318 A1* | 10/2015 | Mayer | .................. | F03D 7/0272 290/44 |
| 2016/0333856 A1* | 11/2016 | Zabalza | .................. | H02H 7/06 |
| 2017/0053736 A9* | 2/2017 | Hall | ....................... | H01F 38/14 |
| 2017/0054301 A1* | 2/2017 | Fintzos | .................... | H02J 3/386 |

FOREIGN PATENT DOCUMENTS

| | | |
|---|---|---|
| EP | 2482421 A1 | 8/2012 |
| WO | 2012/028150 A2 | 3/2012 |
| WO | 2012/089675 A2 | 7/2012 |

OTHER PUBLICATIONS

International Search Report for PCT/DK2013/050313, dated Oct. 9, 2014.
Danish Search Report for PA 2012 70613, dated May 17, 2013.

* cited by examiner

LINE IMPEDANCE COMPENSATION SYSTEM

FIELD OF THE INVENTION

The present invention relates to a power plant controller, arranged for controlling at least one electrical parameter of a wind power plant at a first point in an electrical grid wherein the wind power plant comprises a plurality of wind turbine generators.

BACKGROUND OF THE INVENTION

Internal power grids of wind power plants connect individual wind turbine generators of a wind power plant to a point of common coupling—the latter being the point where power is fed onto a power supply grid from the wind power plant.

In order to do this correctly the impedance of the internal power grid between each of the wind turbines of the plant and the point of common coupling has to be taken into consideration. Especially as the point of common coupling often is where the wind power plant has to fulfill the requirement in the grid code, i.e. grid connection specification.

The wind turbine generators experience impedance to the point of common coupling and thus needs to generate higher wind turbine generator voltage level in order to compensate for voltage drops in the internal power grid. The same applies for reactive power, as reactive power is absorbed in the internal cables.

Wind power plants are often controlled by a power plant controller. The power plant controller controls and communicates with the wind turbine generators and other components in the wind power plant. In order to control the wind turbine generators some measured electrical parameters are needed. The power plant controller and the measurement sensors may be located remotely from the point of common coupling, so due to the impedance in the grid the controlled parameters are not the same at the point of measurement and the point of common coupling.

It may be seen as an object of the embodiments of the present invention to provide a power plant controller that ensures proper values of electrical parameters in a point different from the point of measurement.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Thus, the above described object and several other objects are intended to be obtained in a first aspect of the invention by providing a plant controller, arranged for controlling at least one electrical parameter of a wind power plant at a first point in an electrical grid wherein the wind power plant comprises a plurality of wind turbine generators, the power plant controller comprising:

an input device arranged for receiving at least one measured electrical parameter at a point of measurement, the point of measurement being different from the first point, an algorithm for estimating a delta value of a difference of the at least one electrical parameter between the first point and the point of measurement, wherein estimating of the delta value is calculated based on an impedance between the point of measurement and the first point, and at least one electrical input parameter, and wherein the at least one electrical input parameter is at least one reference value of the power plant controller, and the power plant controller being arranged to control the at least one electrical parameter on the basis of the at least one measured electrical parameter and the delta value.

The invention is particularly, but not exclusively, advantageous to estimate values at the first point, as the delta value is determined based on reference values taken from the power plant controller reference values. In some situations this can be safer compared to use of measurement, due to loss of communication with the sensors, and/or delays in the communication with the sensors if they are far away.

According to one embodiment of the invention, the value of the at least one electrical parameter at the first point is a summation of the at least one measured electrical parameter at the point of measurement and the estimated delta value.

An advantage of this embodiment is that when the delta value is estimated with the reference value, an easy and reliable way to get the measure at the first point is provided by using a summation.

According to one embodiment of the invention the plurality of wind turbine generators is connected to an internal grid, and the wind power plant is connected to an external grid through a point of common coupling, and the first point is the point of common coupling, and the point of measurement is at the internal grid or at the external grid.

An advantage of this embodiment is that when the point of common coupling is far from the wind power plant it may be difficult to make the actual measurements far from the wind power plant and the power plant controller, so the present invention allows the wind power plant to be operated correctly according to set points at the point of common coupling.

According to one embodiment of the invention the electrical parameter is a voltage level, and the at least one electrical input parameter is at least a voltage reference value and a current reference value.

An advantage of this embodiment is that one of the electrical parameter of interest for controlling is voltage, as voltage control of the grid is common.

According to one embodiment of the invention the delta value of the voltage level is estimated according to the following equation:

$$\Delta \vec{V}_s = \vec{I}_{ref} \cdot \vec{Z}_e + V_{ref}\left(\frac{\vec{Y}_e \vec{Z}_e}{2}\right)$$

According to one embodiment of the invention the electrical parameter is reactive power, and the at least one electrical input parameter is at least a voltage reference value and a current reference value.

An advantage of this embodiment is that one of the electrical parameter of interest for controlling is reactive power, as reactive power control of the grid is common, because the amount of reactive power in the grid determines the voltage level.

According to one embodiment of the invention the delta value of the reactive power is estimated according to the following equation:

$$\Delta Q_s = (-V_{ref}^2 Y + XI_{ref}^2) \cdot l$$

According to one embodiment of the invention the at least one electrical parameter is a voltage, and the delta value is derived as a subtraction between the voltage at the first point and the voltage at the point of measurement, multiplied with a predetermined slope function, wherein the predetermined slope function is a function of the impedance between the point of measurement and the first point, and a further multiplication with the voltage at the point of measurement, for hereby estimating a reactive power reference.

An advantage of this embodiment is that knowing the reactance of the system, a droop control with the slope function permits controller the wind power plant at a point of common coupling different from the point of measurement.

According to one embodiment of the invention the reactive power reference is compensated according to the impedance between the point of measurement and the first point, by adding a compensation value.

An advantage of this embodiment is that this embodiment allows for more precise control.

According to one embodiment of the invention the power plant controller calculates a reference set point for the plurality of wind turbine generators, and the power plant controller further comprises a dispatcher to dispatch electrical reference set points to each one of the plurality of wind turbine generators.

An advantage of this embodiment is that the power plant controller provides a way to easily sending out the set points to the plurality of wind turbine generators.

According to one embodiment of the invention the power plant controller further comprises at least one measuring device to measure the least one measured electrical parameter at the point of measurement.

An advantage of this embodiment is that the device for measuring is a part of the power plant controller.

According to one embodiment of the invention the power plant controller acts as a master controller for at least one local power plant controller, the at least one power plant controller controls a subset of the plurality of wind turbine generators.

An advantage of this embodiment is the multilevel power plant controller aspect, wherein a number of wind power plants each with a power plant controller, are controlled by a master power plant controller. Such a system is often spread over a large geographical area so the need for estimating the electrical parameter at a first is even more present, than for at system with one level of power plant controller.

In a second aspect, the present invention relates a method for determining at least one electrical parameter of a wind power plant at a first point in an electrical grid, wherein the wind power plant comprises a plurality of wind turbine generators, the method comprising:
  receiving at least one measured electrical parameter at a point of measurement, the point of measurement being different from the first point,
  estimating a delta value of a difference of the at least one electrical parameter between the first point and the point of measurement,
  controlling the at least one electrical parameter on the basis of the at least one measured electrical parameter and the delta value.

The first and second aspect of the present invention may each be combined with any of the other aspects. These and other aspects of the invention will be apparent from and elucidated with reference to the embodiments described hereinafter.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

The figures show one way of implementing the present invention and is not to be construed as being limiting to other possible embodiments falling within the scope of the attached claim set.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

The present invention relates to a power plant controller which is provided for controller power production of a wind power plant, comprising a plurality of wind turbine generators. The power plant controller generates reactive and active power references, $Q_{ref}$ and $P_{ref}$ respectively, for control of the plurality of wind turbine generators or other wind power plant components for satisfying electrical conditions at a point of measurement.

In an embodiment the power plant controller generates current references to the plurality of wind turbine generators, i.e. $I_{dref}$ and $I_{qref}$, active and reactive current respectively.

The controller is provided with measurement values from a point of measurement, which values are modified according to estimated values at a point of common coupling, and associated reference values (e.g. $V_{ref}$, $f_{ref}$, $Q_{ref}$ etc.) for the point of measurement. The estimated values at the point of common coupling are determined from a model of the transmission line between the point of measurement and point of common coupling, not from measured values from the point of measurement, but from the reference values supplied to the controller ($V_{ref}$, $f_{ref}$, $Q_{ref}$, etc.). At steady state, the reference values are equivalent with the measured values.

The embodiments of the present invention pertain to a power plant controller of a wind power system with a plurality of wind turbine generators. The power plant controller is arranged to estimate electrical parameter in a point of common coupling where the actual measurements are measured at a point of measurement, by means of knowledge of the impedance between the point of measurement and the point of common coupling, and by using reference values of the power plant controller.

In an embodiment the point of common coupling is not coinciding with the place where the electrical parameters are estimated.

The wind turbine generator which supplies power to an electric grid may be equipped with regulation capacity against voltage level, grid-frequency and active power fluctuations. "Electric grid" or "grid" is a utility grid outside the boundary and point of common coupling of a wind power plant; when reference is made to the grid within a wind power plant an expression with explicit indication to the wind power plant is made, e.g., "wind power plant grid".

A variable speed wind turbine generator, which is used in at least one of the described embodiments and which is capable for being connected to an electrical grid 20 is equipped with the control system described. It comprises a rotor with a hub 3 and at least one blade 4 mounted to the rotor as discussed above. The rotor is connected, for example via a main shaft, to a generator 12 for translating the torque of the rotor into electrical power. In some embodiments, a gearbox is interconnected between the rotor and the generator in order to translate the rotational speed of the rotor into a higher speed for the generator.

Figure 1:
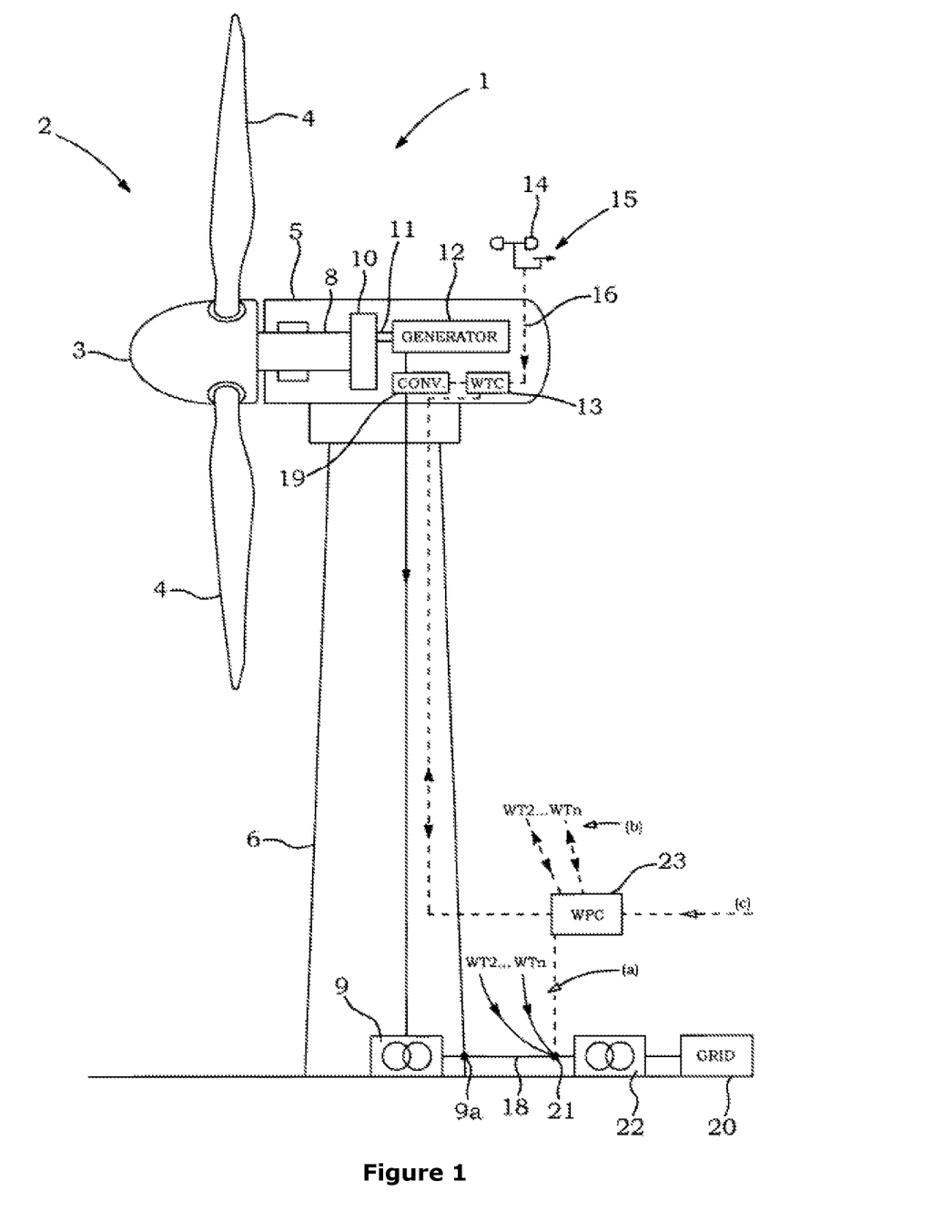
FIG. 1 shows a wind turbine generator according to the present invention.

FIG. 1 shows, an exemplary variable-speed wind turbine generator (WT) 1 is one of a plurality of wind turbine generators of a wind power plant (WPP). It has a rotor 2 with a hub 3 to which, e.g., three blades 4 are mounted. The pitch angle of the rotor blades 4 is variable by means of pitch actuators. The rotor 3 is connected to a nacelle 5 supported by a tower 6 and drives a generator 12 via a main shaft 8, a gearbox 10, and a high speed shaft 11. This structure is exemplary; other embodiments, for example, use a direct-drive generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant is fed into a wind power plant grid 18 (symbolized by "a" in FIG. 1). The internal wind power plant grid 18 is connected at a point of common coupling 21 and an optional further step up transformer 22 to a wind power plant external electrical utility grid 20. The grid 20 is equipped with various regulation capacity against grid fluctuations, e.g. in the form of conventional producers which can increase and lower production on a short-time scale to control voltage and frequency.

A control system includes a wind-turbine controller 13 and a power plant controller 23. The power plant controller 23 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the power plant controller, e.g. an instruction to provide a certain amount of reactive power in addition to the active power, etc. The power plant controller 13 uses different input signals to perform its control tasks, for example signals representing current wind conditions (e.g. from an anemometer 14 and a wind vane 15 transmitted via line 16), feed-back signals representing pitch angle, rotor position, amplitudes and phases of the voltage and current at the generator 12 and the terminals 9a, etc., and command signals from the power plant controller 23. The power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the power plant controller 23 monitors grid stability and, upon detection of a reduction of grid stability, commands the wind-turbine controllers 13 of the wind turbine generator 1 and the other wind turbine generators of the wind power plant 2 (at "b" in FIG. 1) to change operation by limiting fluctuations of the output power supplied. Upon receipt of such a command the wind-turbine controller 13, upon increase of the wind speed, cuts the high-output peak which would then be produced in normal partial-load operation with maximum efficiency, e.g., by adjusting the blade-pitch angle towards the flag position, to comply with the power plant controller's limit-fluctuation command. Thus, in the exemplary embodiment of FIG. 1 the control task of the control system to limit output fluctuations is shared by the power plant controller 23 and the wind-turbine controller 13. In other embodiments this control task is performed by the wind turbine controller 13 alone; in those embodiments, the "control system" is represented just by the wind turbine controller 13, without a power plant controller 23.

Although the wind turbine generator 1 shown in FIG. 1 is expected to have three blades 4, it should be noted that a wind turbine generator may have different number of blades. It is common to find wind turbine generators having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 4 in the rotor 4.

Some embodiments pertain to a control system arranged to control at least one wind turbine generator 1 which may include some, or all, of the wind turbines of a whole wind park, in the manner describe above. The control system can be distributed, e.g. include controllers at the wind power plant and the wind turbine generator level or utility-grid level.

When a measurement system for the power plant controller 23, e.g. a grid meter, does not match with the physical location of the point of common coupling a dedicated control system is needed to compensate for the physical distance. Basically, what it is needed is to compensate for the impedance connecting the measurement point and the point of common coupling.

Figure 2:
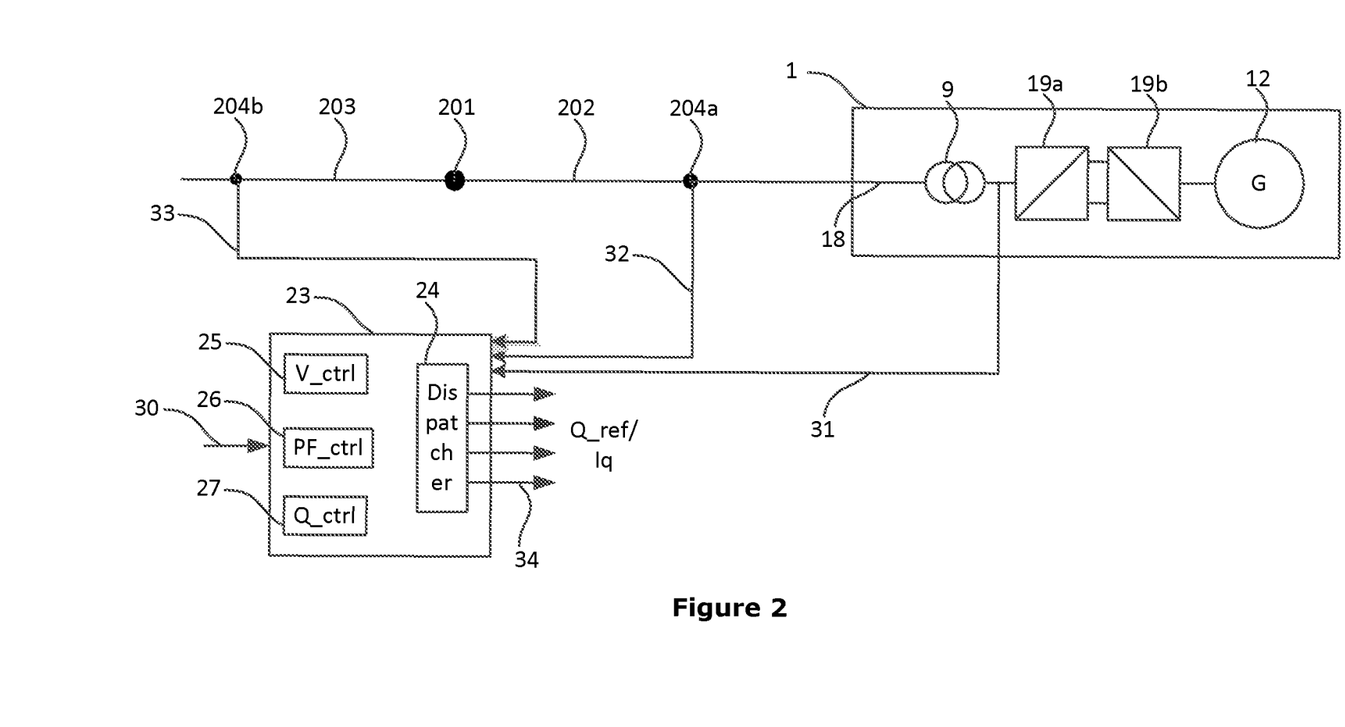
FIG. 2 shows a power plant controller connected to a wind power plant.

FIG. 2 shows a power plant with one wind turbine generator 1 and a controller 23 according to an embodiment of the invention. FIG. 2 only shows one wind turbine generator 1, which comprises similar elements as described in relation to FIG. 1. In FIG. 2 the Figure only shows a generator 12, connected to, and feeding power to a power rectifier 19*b*, that converts variable frequency AC power to DC power, an inverter 19*a* converts the DC power into fixed frequency AC power, the AC power is the transformed to a higher voltage level in a transformer 9, the higher voltage AC power is fed into the wind power plant grid 18, 202. A signal vector 31 containing power production information about the individual wind turbine generator 1, is communicated to the power plant controller 23, from all the other wind turbine generators 1 in the wind power plant. The signal 31 may contain information about the voltage level of the wind turbine generator, at either side of the transformer 9. Often it is beneficial to measure the voltage level at the low voltage side of the transformer, and possibly translate the measurement to a value on the high voltage side of the transformer. Measurements 32 or 33 are measured at a point of measurement 204*a* or 204*b*, "a" or "b" depending on which side of the point of common coupling 201 the actual measurement is taken.

The power plant controller 23 receives a set point 30 to follow from e.g. a grid system operator, and has, depending on the specific plant, different modes of control 25, 26, 27 between which the power plant controller can choose. This may be voltage control 25, power factor control 26, and Q (reactive power) control 27. A state machine of the power plant controller 23 changes the mode, if so required. The dispatcher 24 dispatches a set point 34 to each of the wind turbine generators 1 in the wind power plant. The dispatcher 24 regularly dispatches or communicates set points 34 to the wind turbine generators 1, whenever required.

An increase in reactive power will increase the voltage level at the wind turbine generator terminals, so being in a situation with higher voltage than asked for by the set point 30, the reactive power production needs to be decreased; this is achieved by sending a reactive power set point with a decreased reactive power value. Similarly, being in a situation with lower voltage than required the reactive power set point should be increased in order to raise the voltage level the voltage level at the wind turbine generator terminals.

Often wind power plants, in steady state operational mode, is controlled according to a Power Factor set point, this implies that for a given active power production a corresponding amount of reactive power, inductive or capacitive, needs to be present as well, as the power factor of an AC electrical power system is defined as the ratio of the real power flowing to the load to the apparent power in the circuit.

Other operational mode can be Q control, where the actual amount of reactive power is controlled, thus not in respect of the active power production. Yet another mode can be voltage control where the voltage level is the control parameter, this control is performed by injecting reactive power, inductive or capacitive into the grid and thereby increasing or decreasing the voltage level.

A reason for using power plant controller reference values instead of measurements is among others, loss of communication with the measurement sensors, and/or delays in the communication with the measurement sensors if they are far away. In an embodiment the measurement sensors might not even be present, in case feed-forward control is used.

The compensation for the line impedance can among other embodiments be done in:
  an embodiment with a voltage control loop, where the power plant controller is controlling the voltage at the point of common coupling, or
  an embodiment with a reactive power controller, where the power plant controller is controlling the reactive power at the point of common coupling.

Figure 3:
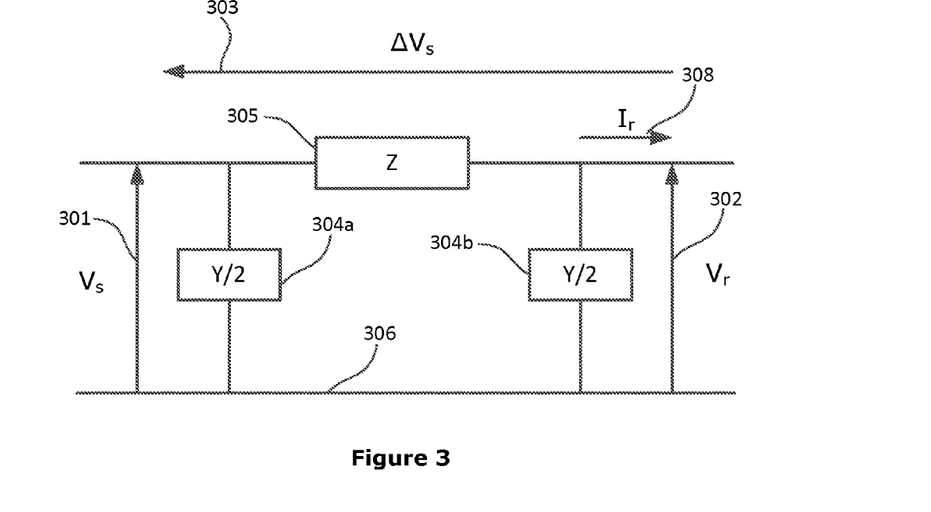
FIG. 3 shows a simplified diagram of the line impedance.

FIG. 3 shows a line diagram of a system according to the invention. A voltage $V_s$ 301 is present in the start end of the line, with a shunt admittance per unit length Y/2 304*a* and a series impedance per unit length Z 305 and at the receiving end another shunt admittance per unit length Y/2 304*b*, and the voltage $V_r$ 302. Through the line a current $I_r$ 308 is flowing, and a voltage drop $\Delta V_s$ 303 defines the voltage drop along the line, which is to be considered.

The series impedance per unit length is given by:

$$\vec{Z} = R + \vec{j}\omega L = R + \vec{j}X$$

The shunt admittance per unit length $$\vec{Y} = G + \vec{j}\omega C$$

An embodiment where the compensating takes place in the voltage control loop requires the following, the line compensation term to be used in the control is:

$$V\text{compensation\_line} = \text{abs}(\Delta \vec{V}_s)$$

Figure 4:
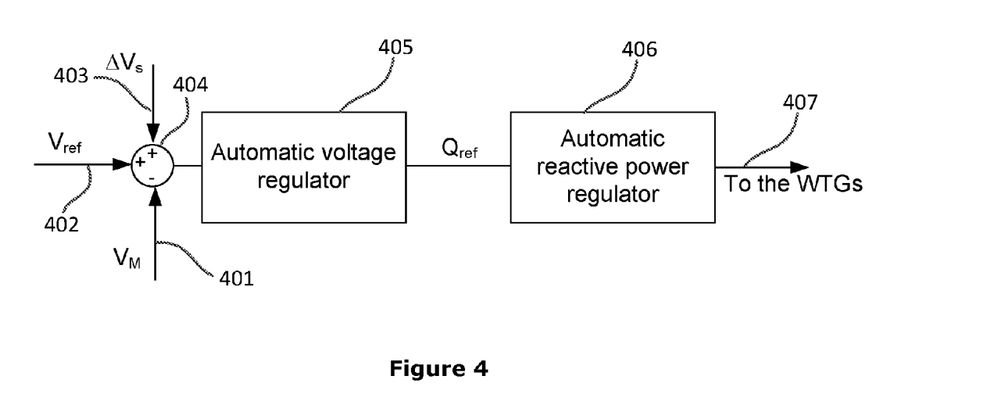
FIG. 4 shows a schematic of the power plant controller, with voltage as input reference.

The following approximations are used:

$$\vec{V}_r = V_{ref}$$

$$\vec{I}_r = \vec{I}_{ref},$$

where $\vec{I}_{ref} = (P_{ref}/V_{ref}) + (Q_{ref}/V_{ref})\vec{j}$ and where reactive power, active power and voltage reference, $Q_{ref}$, $P_{ref}$ and $V_{ref}$ 402 are the wind power plant references.

Relationship between receiving voltage 302 and start voltage 301 of the line is:

$$\vec{V}_s = \vec{V}_r + \Delta \vec{V}_s$$

Where $$\Delta \vec{V}_s = \vec{I}_{ref} \cdot \vec{Z}_e + V_{ref}\left(\frac{\vec{Y}_e \vec{Z}_e}{2}\right) \quad \text{Equation 1}$$

The $\Delta V_s$ equation 1 above is used to derive the delta voltage value, which is the input in the power plant controller shown in FIG. 4.

Using these equations, it is possible to draw the control structure of the power plant controller, as shown in FIG. 4. Which shows the $V_M$, voltage point of measurement 401, $V_{ref}$ 402 and $\Delta V_s$ 403 all summed in the summation block 404, the output of block 404 is fed to the automatic voltage regulator 405 which output a $Q_{ref}$ to an automatic reactive power regulator 406 that controls the reactive power based on the reference and measurements, both regulators can be implemented with a controller structure known to the person skilled in the art. The output of block 407 is a most often an aggregated reactive power set point that will have to be handled by the dispatcher 24, to distribute individual values to each of the plurality of wind turbine generators.

In an embodiment where the compensating happens in the reactive power control loop the following is the case.

Figure 5:
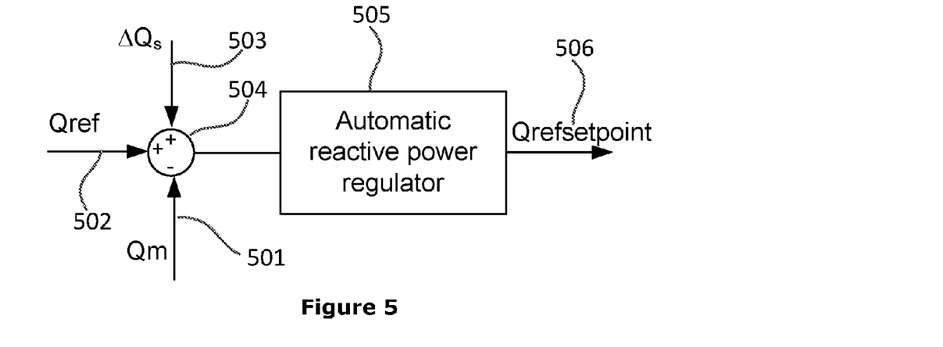
FIG. 5 shows a schematic of the power plant controller, with reactive power as input reference.

FIG. 5 shows the relationship between receiving and start Q values $Q_r$ and $Q_s$ of the line, similar to the voltage case described above:

$$Q_s = Q_r + \Delta Q_s$$

Where $$Q_r = Q_{ref}$$

$$\vec{I}_r = \vec{I}_{ref}, \text{ where } \vec{I}_{ref} = (P_{ref}/V_{ref}) + (Q_{ref}/V_{ref})\vec{j}$$

$$\Delta Q_s = (-V_{ref}^2 Y + X I_{ref}^2) \cdot l \quad \text{Equation 2}$$

where Y is the admittance (Y). Admittance is a measure of how easily a circuit or device will allow a current to flow. It is defined as the inverse of the impedance (Z).

By using these equations, especially the equation 2, which derives the $\Delta Q_s$, it is possible to draw the control structure of a power plant controller, as shown in FIG. 5, where the measurement of the reactive power $Q_m$ 501 at the point of measurement, the reference reactive power $Q_{ref}$ 502 and reactive power delta value $\Delta Q_s$ 503 is summed in a summation block 504, the output of block is used as input the automatic reactive power regulator 505 and the output of that block $Q_{refsetpoint}$ 506 is then ready for the dispatcher 24 to dispatch to the individual wind turbine generators 1.

The following equations are helpful to derive the impedance and the admittance.

$$Z_e = Z_c \sinh(\gamma l)$$

$$\left(\frac{Y_e Z_e}{2} + 1\right) = \cosh(\gamma l)$$

$$Z_c = \sqrt{\frac{R + j\omega L}{j\omega C}}$$

$$\gamma = \sqrt{j\omega C(R + j\omega C)}$$

For a line with $(\gamma l) \ll 1$ the following approximations can be used:

$$Z_e = Z \cdot l$$

$$\left(\frac{Y_e}{2}\right) = \frac{Y \cdot l}{2}$$

where (l) is the line length.

Although the above described embodiments cover the electrical parameter voltage and reactive, similar embodiment can be made for active power.

In an embodiment the power plant controller uses feedforward control instead of the control scheme of FIG. 5, including the $\Delta Q_s$ compensation. The equation is:

$$Q_{ref} - \Delta Q_s = Q_{refsetpoint}$$

Feedforward means that there are no controller block 505 and no $Q_m$ 501, if comparing to FIG. 5.

Figure 6:
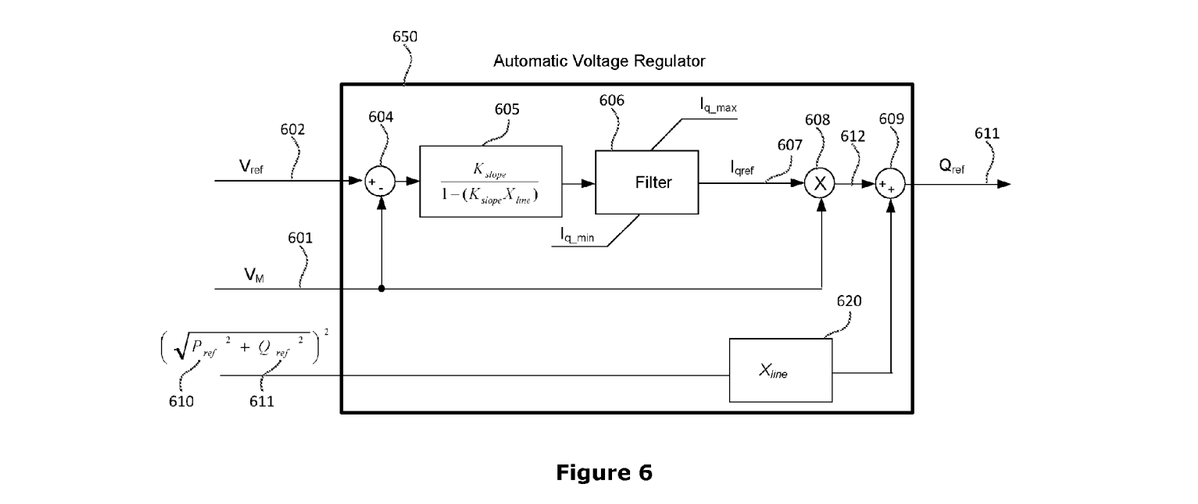
FIG. 6 shows a schematic of the power plant controller, with droop control.

In an embodiment, another control structure is applied where the reactance $X_{line}$ 620 of the line is used to calculate an equivalent $K_{slope}$, which generates the same amount of $I_q$ as there were no line in between PoM 204 and PCC 201.

According to an embodiment of the present invention a voltage controller, which could be within the power plant controller, is provided for generating a reactive power reference, $Q_{ref}$ 611 value for control of one or more wind turbine generators for satisfying electrical conditions at a point of measurement 204. The voltage controller is provided with measurement values from the point of measurement and an associated voltage reference value ($V_{ref}$) for the point of measurement. In order to enable control at the point of common coupling which is separated from the point of measurement by a transmission line having reactance $X_{line}$, the proportional gain of the controller is modified in dependence of $X_{line}$, so that the voltage reference value ($V_{ref}$) is satisfied at the point of common coupling. Accordingly, the voltage controller is modified so the proportional gain of the voltage controller enables control of the voltage of at the point of common coupling.

Instead of using the term $\Delta V_s$ derived in Equation 1, this term represent the voltage drop across the line, the following diagram shown in FIG. 6 is proposed, which offer the same characteristics of $I_q$ injected at PCC.

FIG. 6 shows how the $V_m$ 601 and the $V_{ref}$ 602 are used as inputs to the automatic voltage regulator 650, together with the $P_{ref}$ 610 and $Q_{ref}$ 611. The $V_m$ 601 and the $V_{ref}$ 602 are compared in a summation block 604, the result is used as input for $K_{slope}$ function 605. The $K_{slope}$ function is given by:

$$\frac{K_{slope}}{1 - (K_{slope} \cdot X_{line})}$$

The $K_{slope}$ is the voltage drop gain of the controller 605. The output of the $K_{slope}$ block 605 is fed as input to an optional filter block 606, which is a filtering function, which in an embodiment can be of second order or even higher order. The $P_{ref}$ 610, $Q_{ref}$ 611 and $V_{ref}$ 602 are all the power plant references. $V_M$ 601 is the measured voltage at point of measurement (PoM).

The output of the optional filter 606, and in case the filter isn't present, the output of 605 is a reactive current reference, $I_{qref}$ 607, which is multiplied in the multiplier 608 with $V_M$ 601, which then becomes an intermediate reactive power reference 612. The intermediate reactive power reference 612 needs to be compensated by a loss compensation function, determining a compensation value, which compensates for the losses along the line, the $X_{line}$ 620 is the reactance of the line which has to be compensated, in FIG. 3, the line between 307 and 308. The compensation is a product of the $X_{line}$ 620 and the apparent power (610 and 611) squared, derived by taking the sum of the square of the active power 610 and the square of the reactive power, finally the square root of the sum is calculated as the apparent power. The reactive power reference 611 is the sum 609 of the loss compensation function and the intermediate reactive power reference 612.

Figure 7:
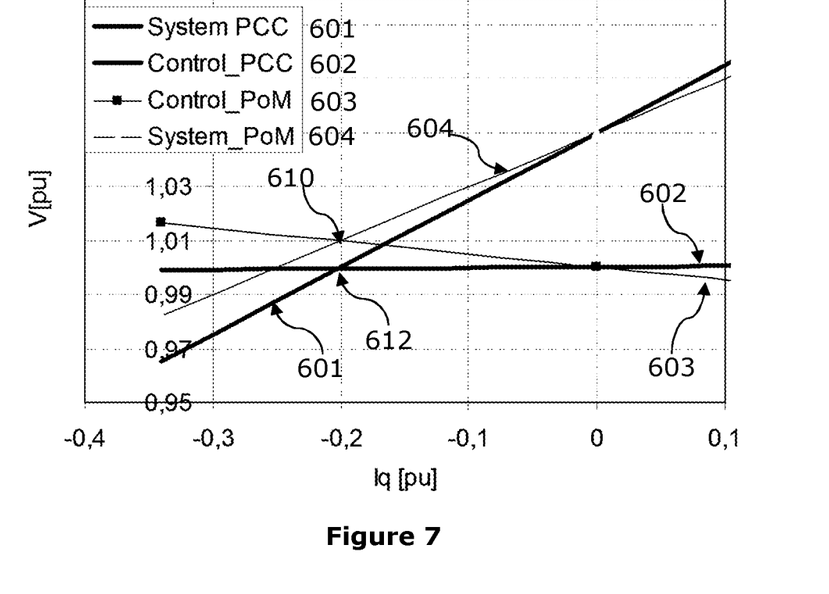
FIG. 7 shows a graph with examples of an embodiment with two voltage droop control functions.

FIG. 7 shows the characteristics of the system at point of common coupling, PCC 201 and at point of measurement, PoM 204a or 204b, with reactive current shown along the x-axis and voltage shown along the y-axis of FIG. 7.

The system PCC 601 in FIG. 7 represents total reactance $X_{total}$ of the grid and the line from the point of measurement and the point of common coupling, the system PoM 604 represents only the grid reactance $X_{grid}$, not the line reactance. The control PCC 602 is the droop control with $K_{slope}$ according to the total reactance, $X_{total}$. Where control PoM 603 is the droop control with $K_{slope}$ according to the grid reactance, $X_{grid}$. Having a predetermined slope function according to the reactance allows control of the voltage at a point of common coupling different from a point of measurement.

It can be seen that the amount of Iq 607 injected is the same, see intersection 612 and 610, for $I_q=-0.2$ p.u., when using the above control, independently of where the PoM is located.

Figure 8:
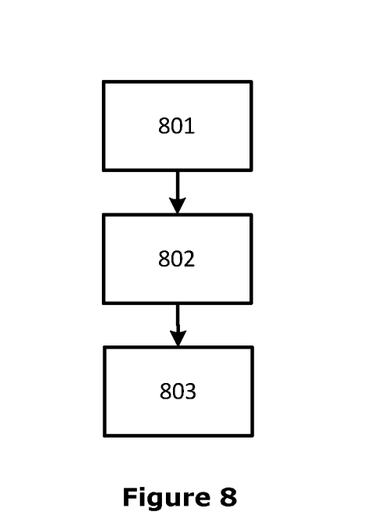
FIG. 8 shows a flow-chart of a method according to the invention.

FIG. 8 show a flow-chart of a method according to the invention for controlling at least one electrical parameter of a wind power plant at a first point in an electrical grid, wherein the wind power plant comprises a plurality of wind turbine generators. Step 801 is receiving at least one measured electrical parameter at a point of measurement, the point of measurement being different from the first point, step 802 is estimating a delta value of a difference of the at least one electrical parameter between the first point and the point of measurement, wherein estimating of the delta value is calculated based on an impedance between the point of measurement and the first point, and at least one electrical input parameter, wherein the electrical input parameter is a reference value of the power plant controller, and step 803 is controlling the at least one electrical parameter on the basis of the at least one measured electrical parameter and the delta value. The method shown in FIG. 8 may be carried out in a power plant controller.

In an embodiment the point of common coupling 201 is located closer to the wind turbine generators than to the point of measurement 204b, i.e. the point of measurement 204b is located in the electrical grid 203, and not in the internal grid 202 of the wind power plant.

In an embodiment of the present invention the method applies for both a system with one wind power plant, but also systems where several wind power plants is controlled by the same master power plant controller, each wind power plant having a local power plant controller.

In summary the invention relates to a power plant controller, controlling at least one electrical parameter of a wind power plant at a first point in an electrical grid wherein the wind power plant comprises a plurality of wind turbine generators, the power plant controller comprising, an input device arranged for receiving at least one measured electrical parameter at a point of measurement, the point of measurement being different from the first point, and an algorithm for estimating a delta value of a difference of the at least one electrical parameter between the first point and the point of measurement, wherein estimating of the delta value is calculated based on an impedance between the point of measurement and the first point, and at least one electrical input parameter, and wherein the at least one electrical input parameter is at least one reference value of the power plant controller. The present invention also relates to a method for determining at least one electrical parameter of a wind power plant at a first point in an electrical grid.

The embodiment of the invention presented here relates mainly to a wind turbine generator, but is it not limited to wind power. Other sources of power production are also considered. Wherever the wording controller or regulator is used it is understood that such controller can be selected from controllers known to the person skilled in the art, such as PID, PI, P or with fuzzy logic, but not limited to the list.

Any range or device value given herein may be extended or altered without losing the effect sought, as will be apparent to the skilled person.

The invention can be implemented by means of hardware, software, firmware or any combination of these. The invention or some of the features thereof can also be implemented as software or computer programmable code running on one or more data processors and/or digital signal processors, i.e. computer.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. A power plant controller of a wind power plant comprising a plurality of wind turbine generators, the power plant controller configured to:
   receive at least one measured electrical parameter at a point of measurement located at a first location on a grid coupled with the wind power plant, wherein the point of measurement is different from a first point located at a second location on the grid,
   estimate a delta value of a difference of at least one electrical parameter between the first point and the point of measurement, wherein the delta value is based on an impedance between the point of measurement and the first point, and a reference value of the power plant controller, and
   control the at least one electrical parameter based on the at least one measured electrical parameter and the delta value.

2. The power plant controller according to claim 1, wherein a value of the at least one electrical parameter at the first point is a summation of the at least one measured electrical parameter at the point of measurement and the delta value.

3. The power plant controller according to claim 1, wherein the grid comprises an internal grid and an external grid, wherein the plurality of wind turbine generators is connected to the internal grid, and wherein the wind power plant is connected to the external grid through a point of common coupling, and the first point is the point of common coupling, and the point of measurement is at the internal grid or at the external grid.

4. The power plant controller according to claim 1, wherein the electrical parameter is a voltage level, and wherein the at least one electrical input parameter is at least a voltage reference value and a current reference value.

5. The power plant controller according to claim 4, wherein the delta value of the voltage level is estimated according to the following equation:

$$\Delta \vec{V}_s = \vec{I}_{ref} \cdot \vec{Z}_e + V_{ref}\left(\frac{\vec{Y}_e \vec{Z}_e}{2}\right).$$

6. The power plant controller according to claim 1, wherein the electrical parameter is reactive power, and wherein the reference value is at least a voltage reference value and a current reference value.

7. The power plant controller according to claim 6, wherein the delta value of the reactive power is estimated according to the following equation:

$$\Delta Q_s = (-V_{ref}^2 Y + XI_{ref}^2) \cdot l.$$

8. The power plant controller according to claim 1, wherein the at least one electrical parameter is a voltage, and wherein the delta value is derived as a subtraction between the voltage at the first point and the voltage at the point of measurement, multiplied with a predetermined slope function, wherein the predetermined slope function is a function of the impedance between the point of measurement and the first point, and a further multiplication with the voltage at the point of measurement, for hereby estimating a reactive power reference.

9. The power plant controller according to claim 8, wherein the reactive power reference is compensated according to the impedance between the point of measurement and the first point, by adding a compensation value.

10. The power plant controller according to claim 1, wherein the power plant controller calculates a reference set point for the plurality of wind turbine generators, and the power plant controller further comprises a dispatcher to dispatch electrical reference set points to each of the plurality of wind turbine generators.

11. The power plant controller according to claim 1, wherein the power plant controller further comprises at least one measuring device to measure the at least one measured electrical parameter at the point of measurement.

12. The power plant controller according to claim 1, wherein the power plant controller acts as a master controller for at least one local power plant controller, and the at least one local power plant controller controls a subset of the plurality of wind turbine generators.

13. A wind power plant arranged to be controlled by a power plant controller according to claim 1.

14. A method for controlling at least one electrical parameter of a wind power plant at a first point located at a first location on an electrical grid coupled with the wind power plant, wherein the wind power plant comprises a plurality of wind turbine generators, the method comprising:

receiving at least one measured electrical parameter at a point of measurement located at a second location on the electrical grid, wherein the point of measurement is different from the first point, estimating a delta value of a difference of the at least one electrical parameter between the first point and the point of measurement, wherein the delta value is based on an impedance between the point of measurement and the first point, and a reference value of a power plant controller, and controlling the at least one electrical parameter on based on the at least one measured electrical parameter and the delta value.

15. The method according to claim 14, wherein a value of the at least one electrical parameter at the first point is a summation of the at least one measured electrical parameter at the point of measurement and the delta value.

16. The method according to claim 14, wherein the electrical grid comprises an internal grid and an external grid, wherein the plurality of wind turbine generators is connected to the internal grid, and wherein the wind power plant is connected to the external grid through a point of common coupling, and the first point is the point of common coupling, and the point of measurement is at the internal grid or at the external grid.

17. The method according to claim 14, wherein the electrical parameter is a voltage level, and wherein the reference value is at least a voltage reference value and a current reference value.

18. The method according to claim 17, wherein the delta value of the voltage level is estimated according to the following equation:

$$\Delta \vec{V}_s = \vec{I}_{ref} \cdot \vec{Z}_e + V_{ref}\left(\frac{\vec{Y}_e \vec{Z}_e}{2}\right)$$

19. The method according to claim 14, wherein the electrical parameter is reactive power, and wherein the reference value is at least a voltage reference value and a current reference value.

20. The method according to claim 19, wherein the delta value of the reactive power is estimated according to the following equation:

$$\Delta Q_s = (-V_{ref}^2 Y + XI_{ref}^2) \cdot l.$$

\* \* \* \* \*